(12) United States Patent
Sherif et al.

(10) Patent No.: US 12,125,015 B2
(45) Date of Patent: Oct. 22, 2024

(54) TRANSACTION CARD WITH INTEGRATED USB DEVICE

(71) Applicant: Capital One Services, LLC, McLean, VA (US)

(72) Inventors: Timur Sherif, Washington, DC (US); Matthew Kloster, Arlington, VA (US); Tao Lin, McLean, VA (US); Kevin Osborn, Newton Highlands, MA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 18/382,352

(22) Filed: Oct. 20, 2023

(65) Prior Publication Data

US 2024/0152894 A1   May 9, 2024

Related U.S. Application Data

(63) Continuation of application No. 17/884,362, filed on Aug. 9, 2022, now Pat. No. 11,829,979, which is a continuation of application No. 16/528,991, filed on Aug. 1, 2019, now Pat. No. 11,443,292.

(51) Int. Cl.
*G06Q 20/20* (2012.01)
*G06F 13/42* (2006.01)
*G06Q 20/38* (2012.01)

(52) U.S. Cl.
CPC ....... *G06Q 20/204* (2013.01); *G06F 13/4282* (2013.01); *G06Q 20/382* (2013.01); *G06F 2213/0042* (2013.01)

(58) Field of Classification Search
CPC .............. G06Q 20/204; G06Q 20/382; G06Q 20/3226; G06Q 20/341; G06Q 20/401; G06F 13/4282; G06F 2213/0042
See application file for complete search history.

(56) References Cited

U.S. PATENT DOCUMENTS

| | | | |
|---|---|---|---|
| 6,883,718 | B1 | 4/2005 | Le et al. |
| 7,344,072 | B2 | 3/2008 | Gonzalez et al. |
| 7,537,169 | B2 | 5/2009 | Gonzalez et al. |
| 9,569,767 | B1 | 2/2017 | Lewis et al. |
| 11,210,641 | B2 | 12/2021 | Grassadonia et al. |
| 2009/0069050 | A1 | 3/2009 | Jain et al. |
| 2009/0070272 | A1 | 3/2009 | Jain |

(Continued)

*Primary Examiner* — Michael Jared Walker
(74) *Attorney, Agent, or Firm* — HUNTON ANDREWS KURTH LLP

(57) ABSTRACT

A transaction card is provided for communicating with a computing device. The transaction card may comprise a computer interface device, at least one memory, at least one processor, and a card reader module. The card reader module configured to receive, from the computing device through the computer interface device, a first data packet comprising a request associated with a transaction, the first data packet being compatible with an interface protocol. The card reader module may process the first data packet to generate a second data packet compatible with the payment authentication protocol; provide the second data packet to the processor; receive, from the processor, a third data packet comprising a response to the request; process the third data packet to generate a fourth data packet based on the response, the fourth data packet compatible with the interface protocol; and transmit, to the computer interface device, the fourth data packet.

21 Claims, 7 Drawing Sheets

(56) References Cited

U.S. PATENT DOCUMENTS

| | | |
|---|---|---|
| 2009/0144202 A1 | 6/2009 | Hurry |
| 2011/0022835 A1 | 1/2011 | Schibuk |
| 2011/0177852 A1 | 7/2011 | Jain et al. |
| 2012/0074219 A1 | 3/2012 | Burdett |
| 2014/0006205 A1 | 1/2014 | Berry et al. |
| 2014/0076967 A1 | 3/2014 | Pushkin et al. |
| 2014/0129356 A1 | 5/2014 | Jain et al. |
| 2014/0236842 A1 | 8/2014 | Salminen et al. |
| 2015/0161591 A1 | 6/2015 | Yang |
| 2015/0199684 A1 | 7/2015 | Maus et al. |
| 2016/0307188 A1 | 10/2016 | Zarakas et al. |
| 2016/0307189 A1 | 10/2016 | Zarakas et al. |
| 2016/0307190 A1 | 10/2016 | Zarakas et al. |
| 2016/0371683 A1 | 12/2016 | Maus et al. |
| 2017/0031860 A1 | 2/2017 | Hulbert et al. |
| 2017/0076275 A1 | 3/2017 | Mutisya |
| 2017/0109730 A1 | 4/2017 | Locke et al. |
| 2017/0154328 A1 | 6/2017 | Zarakas et al. |
| 2017/0202040 A1 | 7/2017 | Chatterton |
| 2017/0270399 A1 | 9/2017 | Ross |
| 2017/0310654 A1 | 10/2017 | Karlisch et al. |
| 2017/0352025 A1 | 12/2017 | Loscher et al. |
| 2018/0018665 A1 | 1/2018 | Chene et al. |
| 2018/0047014 A1 | 2/2018 | Maus et al. |
| 2018/0181951 A1 | 6/2018 | Goldfinger et al. |
| 2018/0181958 A1 | 6/2018 | Locke |
| 2019/0172055 A1 | 6/2019 | Hale et al. |

TRANSACTION CARD WITH INTEGRATED USB DEVICE

CROSS-REFERENCE TO RELATED APPLICATIONS

This application is a continuation of U.S. patent application Ser. No. 17/884,362 filed Aug. 9, 2022, which is a continuation of U.S. patent application Ser. No. 16/528,991 filed Aug. 1, 2019, now U.S. Pat. No. 11,443,292, the complete disclosures of which are incorporated herein by reference in their entireties.

TECHNICAL FIELD

The disclosed embodiments generally relate to a transaction card, and particularly, to a transaction card with integrated interface components, such as a Universal Serial Bus (USB) device, that can be plugged into a computing device.

BACKGROUND

Transaction cards, such as credit and debit cards, have become a primary means for customers to conduct financial transactions. But many transaction card providers are moving away from using magnetic strip technology and now include more advanced transaction components attached to or embedded within a transaction card. For example, some transaction cards now include microchips (e.g., microchips based on the Europay, MasterCard, and Visa standard, also called "EMV chips") that more securely and efficiently manage card and customer information.

In recent years, online retail or "e-commerce" has become increasingly popular and many consumers complete purchases online, for example, through a personal computer. These online transactions, however, often don't allow for the additional security benefits provided by smart cards with EMV as standard computers, such as a desktop or laptop computer, have no way of connecting directly to a smart card. Therefore, in such online transactions, an online retailer has no way of verifying whether the person making the purchase is in actual physical possession of the card, which may present security risks both for the online retailer and the cardholder. To provide such functionality, conventional techniques require a user to purchase and use a separate auxiliary card reader device. These card readers, however, add additional expense and inconvenience for customers making online purchases.

Accordingly, in view of these and other deficiencies in existing techniques, technological solutions are needed for conducting a transaction using a transaction card on a standard computer. Solutions should advantageously allow the transaction card to be plugged directly into the computing device using a widely used type of connection port. Further, the transaction card should be configured such that the cardholder may make card-present transactions, for example, using an EMV chip on the card.

SUMMARY

The disclosed embodiments relate to a transaction card with an integrated USB or other interface device.

In one embodiment, the transaction card may comprise a computer interface device configured to connect to a port of a computing device; at least one memory device storing instructions; at least one processor for executing the instructions to conduct a verification process for a transaction using a payment authentication protocol; and a card reader module communicatively coupled to the computer interface device and the at least one processor. The card reader module may be configured to receive, from the computing device through the computer interface device, a first data packet comprising a request associated with the transaction, wherein the first data packet is compatible with an interface protocol. The card reader module may further be configured to process the first data packet to generate a second data packet compatible with the payment authentication protocol; provide the second data packet to the at least one processor; receive, from the at least one processor, a third data packet comprising a response to the request; process the third data packet to generate a fourth data packet based on the response, the fourth data packet compatible with the interface protocol; and transmit, to the computer interface device, the fourth data packet.

In another embodiment, a method for completing a transaction by transaction card is disclosed. The method may comprise receiving, from a computing device through a computer interface device, a first data packet comprising a request associated with a transaction, the transaction being associated with a payment authentication protocol, the first data packet being compatible with an interface protocol. The method may also comprise processing, by a card reader module disposed on the transaction card, the first data packet to generate a second data packet compatible with the payment authentication protocol; processing the request using a secure element disposed on the transaction card; generating a third data packet based on the processing of the request; processing, by the card reader module, the third data packet to generate a fourth data packet compatible with the interface protocol; and transmitting, to the computing device through the computer interface device, the fourth data packet.

In another embodiment, the transaction card may comprise a computer interface device configured to connect to a port of a computing device; at least one processor configured to execute a transaction associated with a payment authentication protocol; and a card reader module. The card reader module may be configured to detect that the computer interface device has been connected to the port of the computing device; receive, in response to the detected connection, a first request associated with the transaction, the first request being associated with a data communication protocol; process the first request to generate a second request being compatible with the payment authentication protocol; receive, from the at least one processor, a first response based on the second request, wherein the first response is compatible with the payment authentication protocol; process the first response to generate a second response, the second response being associated with the data communication protocol; and transmit, to the computer interface device, the fourth data packet to complete the transaction.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
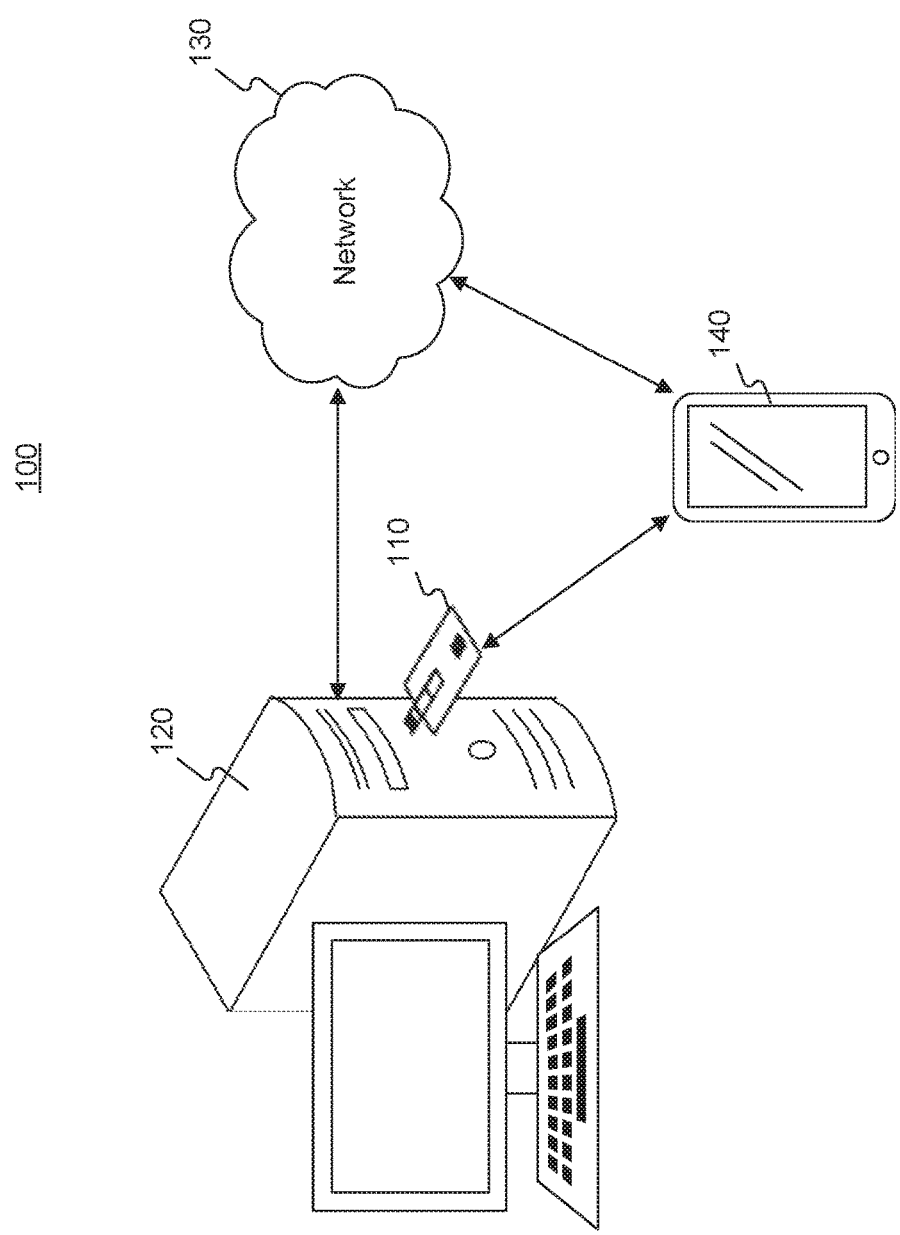
FIG. 1 is a block diagram of an exemplary transaction environment for use with a transaction card in accordance with the disclosed embodiments.

The present disclosure provides a transaction card with an integrated Universal Serial Bus (USB) or other computer interface device such that the transaction card may be inserted into a port of a computing device. The transaction card may also comprise an integrated card reader module configured to provide a communication interface between the USB device (or other such interface device) and the internals of the transaction card, as described in greater detail below.

Interfacing directly with the computing device may overcome several technological problems relating to security, efficiency, convenience, and functionality associated with use of the transaction card. For example, the integrated USB device may allow an online retailer to accept a payment through USB or another protocol rather than requiring the customer to type in their 16-digit card number on the website. If the transaction card is compatible with an EMV cryptographic exchange, the retailer may accept the payment as a card-present transaction, thereby reducing the risk of fraud. Further, the transaction card may allow for better or additional means of verifying a cardholder's credentials, for example, as a form of two-factor authentication. A cryptographic exchange between the transaction card and the computing device allows the computing device or an application on the computing device to verify that the user of the transaction is in physical possession of the card, thereby enhancing security.

As used herein, "cardholder" may refer to an authorized user of a transaction card. For example, a cardholder may be a customer of a financial institution, such as a bank, a credit union, a credit card issuer, or other type of financial service entity that generates, provides, manages, and/or maintains financial service accounts for one or more customers. The cardholder may be associated with a financial service account, such as a credit card account, checking account, savings account, loan account, reward account, and any other type of financial service account known to those skilled in the art. The cardholder and/or financial service account may be associated with physical transaction cards, such as a credit or debit cards that a cardholder may carry on their person and be authorized to use to perform financial service transactions, for example, at a point of sale (POS) terminal, through an online transaction, at an automated teller machine (ATM), etc. In some embodiments, a cardholder may be a customer of a business entity, such as a retail establishment, restaurant, online retailer, etc., such that the customer is associated with an account with the business entity (e.g., an Amazon™ account, retail account, account associated with a gift card balance, etc.).

Additional aspects of the disclosed embodiments are set forth below in this disclosure. Reference will now be made in detail to exemplary embodiments, examples of which are illustrated in the accompanying drawings and disclosed herein. Wherever convenient, the same reference numbers will be used throughout the drawings to refer to the same or like parts. In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

FIG. 1 is a block diagram of an exemplary transaction environment 100 for use with a transaction card in accordance with the disclosed embodiments. Environment 100 may comprise a transaction card 110 with an integrated interface device (e.g., a USB device), a computing device 120, and a network 130. In some embodiments, environment 100 may further comprise an auxiliary device 140. It should be appreciated, however, that transaction environments 100 consistent with the disclosed embodiments may include additional and/or alternative components than those shown in FIG. 1.

Transaction card 110 may be any physical card product configured to provide information, such as financial information (e.g., card numbers, account numbers, etc.), quasi-financial information (e.g., rewards balance, discount information, etc.) and/or individual-identifying information (e.g., name, address, etc.), to another device. Examples of transaction cards include credit cards, debit cards, gift cards, rewards cards, frequent flyer cards, merchant-specific cards, discount cards, identification cards, and driver's licenses, but are not limited thereto. As shown in FIG. 1, transaction card 110 may be configured to be inserted into a port, such as a USB port, of computing device 120 to provide a communication interface between the transaction card 110 and computing device 120. In some embodiments, transaction card 110 may further be configured to communicate with other devices, such as auxiliary device 140 or other computing devices connected to network 130.

Computing device 120 may be any device capable of communicating with transaction card 110. In some embodiments, computing device 120 may be a personal computer such a desktop or laptop computer and may have one or more ports for receiving transaction card 110. Computing device 120 may be various other devices, such as an a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home devices, industrial devices, etc.), an automotive computer, a gaming console, and/or various other devices capable of processing and/or receiving data from transaction card 110.

In some embodiments, as discussed further below, computing device 120 may be used for completing an online transaction, such as a purchase at a website. Accordingly, computing device 120 may include one or more network adaptors or communication devices and/or interfaces (e.g., WiFi, Bluetooth®, RFID, NFC, RF, infrared, Ethernet, etc.) to communicate through network 130. Computing device 120 may further include one or more input/output devices, such as a keyboard, mouse, trackball, touch pad, touch screen, stylus, display, speakers, camera, physical ports, and/or the like. In some aspects, computing device may have similar or the same components as transaction card 110.

Network 130 may be any type of network that facilitates communications and data transfer between components of transaction environment 100, such as, for example, computing device 120, auxiliary device 140, and/or other computing components connected to network 130. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth™, Near Field Communication, infrared, etc.), or various other types of network communications. In some embodiments, the communications may take place across two or more of these forms of networks and protocols.

Computing device 120 may communicate with one or more servers or other computing devices (not shown) using network 130. For example, computing device 120 may access a server associated with an online retailer. A user of computing device 120 may insert transaction card 110 into a port of computing device 120 to complete a purchase through the online retailer. Computing device 120 may be configured to access information associated with transaction card 110, including an account number, expiration date, cardholder name, cardholder address, or other financial or identification information. Computing device 120 may therefore execute a payment using transaction card 110 without requiring a user to enter payment information such as their account number. Further, computing device 120 and transaction card 110 may enable the online retailer to accept a card-present payment using transaction card 110. For example, computing device 120 may be configured to execute an EMV cryptographic exchange using transaction card 110.

In certain embodiments, environment 100 may further comprise an auxiliary device 140. Auxiliary device 140 may be any device capable of communicating with transaction card 110 wirelessly or via a remote connection (e.g., over network 130). In some embodiments, auxiliary device 140 may be a mobile device that is associated with the cardholder. It is understood however, that auxiliary device 140 may be various other devices, including those described above with respect to computing device 120. In some embodiments, auxiliary device 140 may be used to further authenticate a user or facilitate a transaction, as described below with respect to process 900. In some embodiments, auxiliary device may contain similar or the same components as transaction card 110 or computing device 120.

Figure 2:
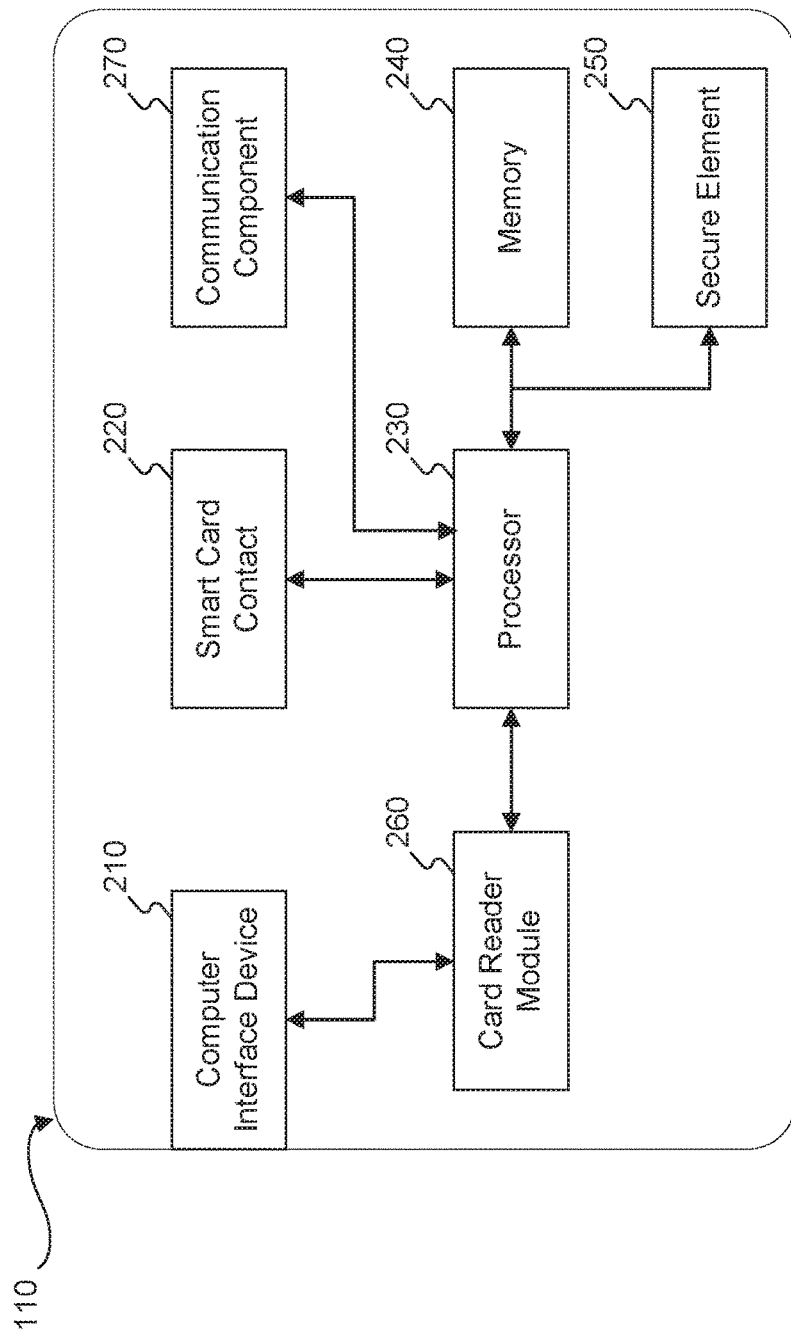
FIG. 2 is a block diagram of an exemplary transaction card with an integrated interface device in accordance with disclosed embodiments.

FIG. 2 is a block diagram of an exemplary transaction card 110 with an integrated interface device in accordance with disclosed embodiments. Transaction card 110 may comprise various components for performing a transaction, as shown in FIG. 2. Transaction card 110 may comprise one or more computer interface devices 210, such as a USB device, a smart card contact 220, a processor 230, memory 240, secure element 250, a card reader module 260, and a communication component 270. It should be appreciated, however, that transaction card 110 may include additional and/or alternative components than those shown in FIG. 2. It is understood that one or more of the described components may comprise multiple components or subcomponents. Further, it is understood that in some instances, one or more of the described components may be combined into a single component.

Computer interface device 210 may be any device or element for connecting with a computing device, such as computing device 120. In some embodiments, computer interface device 210 may be a USB connector (e.g., USB-A, USB-B, USB-C, Lightning, Micro-A, Micro-B, Mini-A, Mini-B, etc.). Computer interface device 210 may be various other forms of connectors, including DVI, DisplayPort, eSATA, Firewire, 30-pin, HDMI, etc. In some embodiments, computer interface device 210 may communicate with computing device 120 through a memory card slot. Accordingly, computer interface device 210 may be compatible with a memory card family, such as MultiMediaCard (MMC), Secure Digital (SD), Memory Stick, XQD, XD, etc. Various other forms of connectors may be provided and the present disclosure is not limited to the connectors described above. Computer interface device 210 may further be configured to receive power from computing device 120 for powering processor 230, card reader module 260 and various other components of transaction card 110.

Smart card contact 220 may be configured to make physical contact with a traditional smart card reader device and may be communicatively connected to processor 230 to facilitate transactions or authentication protocols. For example, smart card contact 220 may be used to make financial transactions through a card reader, for example, at a merchant device, a POS device, a chip reader, an ATM, etc. Computer interface device 210 may be used instead of smart card contact 220 when transaction card 110 is inserted into computing device 120, thus obviating the need for a separate card reader device.

Processor (or processors) 230 may be configured to process and exchange information for executing a transaction and/or authentication request. Processor 230 may comprise a computer, a microprocessor, a processing unit, an integrated circuit, an application specific integrated circuit (ASIC), or the like. Processor 230 may be configured to run applications stored in memory 240 (e.g., as stored in instructions) for executing a transaction or authentication process. For example, processor 230 may perform a card authentication process, cardholder verification process, or transaction authorization process associated with a transaction. Processor 230 may communicate with computing device 120 through computer interface device 210 and card reader module 260. Processor may also be able to communicate with other computing devices, such as those through communication component 270.

Memory (or memories) 240 may include one or more storage devices configured to store instructions to perform operations related to a transaction. Memory 240 may be any form of storage device that may be included on a transaction card, such as a dynamic random access memory (DRAM), a static random access memory (SRAM), a flash memory, an embedded multi-media controller (eMMC), an electrically erasable programmable read-only memory (EEPROM), or the like. Memory 240 may be configured to store applications, such as Europay Mastercard® Visa® (EMV) applications, that provide instructions for completing a transaction or a cardholder verification process. Memory 240 may comprise other data, such as lifecycle information, intellectual property information, manufacturer information, personalization data (e.g., account numbers, keys, transaction counters, etc.), biometric information (e.g., fingerprint templates, etc.), or the like.

Transaction card 110 may further comprise a secure element 250, which may store sensitive data and perform secure operations depending on the applications supported by transaction card 110. For example, secure element 250 may store a cryptographic key which may be used to digitally sign information received from processor 230. The signed information may be used to create unique transaction data for use in a card authentication process. In some embodiments, secure element 250 may be combined with processor 230 and/or memory 240. For example, memory 240 may store data for authenticating transaction card 110 in a secure location.

Transaction card 110 may further comprise a card reader module 260 for interfacing between computer interface device 210 and processor 230 or other computing components of environment 100. In some embodiments, data received through computer interface device 210 may not be directly compatible with processor 230 or other components of transaction card 110 (e.g., communication component 270). Accordingly, card reader module 260 may convert data received through computer interface device 210 into data that may be read and processed by processor 230 and/or other components of card 110. Card reader module 260 may also convert data in a reciprocal manner, such as translating data associated with processor 230 or another component of transaction card 110 into a format compatible with computer interface device 210 (e.g., to facilitate communication with computing device 120 or another such computing device). For example, transaction card 110 may conform to a smart card standard, such as ISO/EIC 7816 and, accordingly, processor 230 may be configured to communicate via Application Protocol Data Units (APDUs) conforming to ISO/EIC 7816-4. Card reader module 260 may comprise a memory device for storing instructions for converting the data and a processor for executing the instructions. Card reader module 260 may perform various functions that would otherwise be performed by a separate physical card reader. Therefore, transaction card 110 may interface directly with computing device 120, thereby obviating the need for an auxiliary card reader device.

As an illustrative example, if computer interface device 210 is a USB connection, computing device 120 may send a request to transaction card 110 according to a USB protocol. The request may comprise a request for transaction card 110 to perform a card verification process to verify that the person trying to complete a transaction on computing device 120 is in actual physical possession of the card. The request may be transmitted in the form of one or more data packets according to the USB protocol. In addition to data associated with the request, the packets may include, for example, control information (e.g., source, destination, length of data, etc.), error detection and correction bits, or the like. Card reader module 260 may be configured to interpret the data packets and convert them to a format compatible with components of the transaction card 110, for example, into a command APDU. As an example, card reader module 260 may process the received request to include a mandatory header (including a class byte, an instruction byte, parameter bytes, etc.), to reformat data from one format to another, or any other processing steps required to format the received data. Similarly, when card reader module 260 receives data from processor 230, card reader module 260 may process the data and transmit it to computing device 120 (e.g., via computer interface device 210). For example, card reader module 260 may receive a response ADPU from processor 230 including a mandatory trailer comprising a status word. Card reader module 260 may process the response ADPU and convert it into data packets conforming to the USB protocol associated with computer interface device 210.

In some embodiments, transaction card 110 may include communication component 270 and/or various other components. Communication component 270 may be configured to provide an additional or alternate channel for communication with a device, such as computing device 120 or auxiliary device 140. For example, communication component 270 may be a short-range wireless device (e.g., Bluetooth®, NFC, RF, RFID, etc.). Communication component 270 may be powered by a connection with computing device 120 through computer interface device 210. Communication component 270 may be configured to perform additional verification of the transaction card or the cardholder, as described below with respect to process 900, or various other functions. In some embodiments, communication component may send a notification, status information or other data to auxiliary device 140, which may be a mobile device of the cardholder. In certain aspects, communication component may be configured to transmit and receive data over network 130 to perform processes consistent with the disclosed embodiments.

Transaction card 110 may be constructed of various materials suitable for a transaction card. For example, transaction card 110 may be manufactured out of plastic such as polycarbonate (PC) or polyvinyl chloride (PVC). Various other materials may also be used, including (soft touch plastic, aluminum, fiber composite materials, resin, etc.). In some embodiments, a card frame (not shown) disposed on transaction card 110 may include additional material features, such as coverings (e.g., a silicone overmold), veneers (e.g., a wooden veneer), finishes (e.g. an oil-slick aluminum finish), or the like.

Figure 3A:
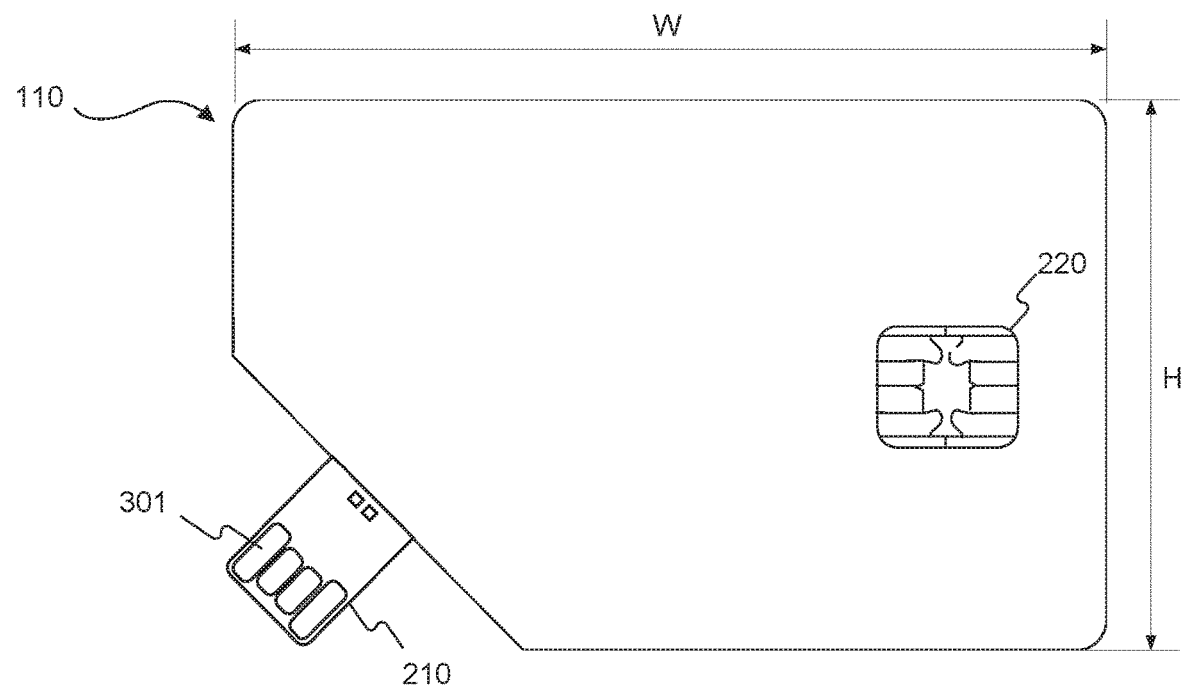
FIGS. 3A and 3B illustrate an exemplary transaction card with an integrated interface device on a corner of the transaction card in accordance with disclosed embodiments.

The physical properties of transaction card 110 (e.g., size, flexibility, location of various components included in the card) may meet the various international standards, including, for example, ISO/IEC 7810, ISO/IEC 7811, ISO/IEC 7812, ISO/IEC 7813, ISO/IEC 7816, ISO 8583, ISO/IEC 4909, and ISO/IEC 14443. As shown in FIG. 3A, for example, transaction card 110 may have a width (W) of approximately 85.60 mm, a height (H) of approximately 53.98 mm, and a thickness of approximately 0.76 mm, as specified in ISO/IEC 7810. In some embodiments, transaction card 110 may be thicker as to accommodate various features of transaction card 110, such as computer interface device 210. It would be apparent to one of skill in the art that other dimensions and layouts of card components of transaction card 110 are possible as well.

As described above, computer interface device 210 may be configured to connect to a variety of ports of a computer, such as USB-A, USB-B, USB-C, Lightning, Micro-A, Micro-B, Mini-A, Mini-B, or the like. The physical properties of computer interface device 210 (e.g., size, flexibility, location of various components included in the card) may meet various standards for data connectors, such as various USB standards. In some embodiments, computer interface device 210 may be configured to be substantially the same thickness as transaction card 110. In some embodiments, computer interface device may be a shieldless device, configured to fit into a USB port. For example, computer interface device may have a similar size and configuration as a user data protocol (UDP) style flash drive and may be insertable into a standard USB port. Accordingly, computer interface device 210 may have a thickness of approximately 1 mm.

Figure 3B:
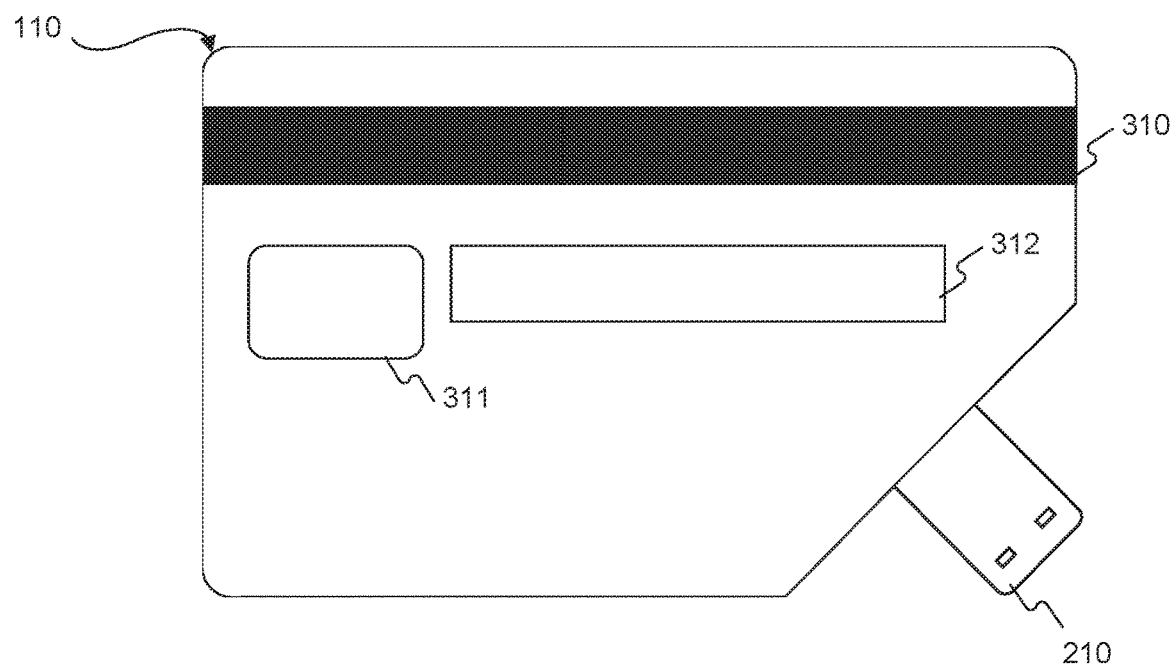

Consistent with the disclosed embodiments, transaction card 110 may have various configurations for integrating computer interface device 210. For example, computer interface device 210 may be disposed in various locations and configurations on transaction card 110. FIGS. 3A and 3B illustrate an exemplary transaction card 110 with an integrated USB device 210 on a corner of the card in accordance with disclosed embodiments. For example, as shown in FIGS. 3A and 3B, one corner of transaction card 110 may have a cutout on one corner to include computer interface device 210.

Computer interface device 210 may be configured such that the overall card dimensions still comply with one or more of the various standards described above. For example, interface device 210 may still fit within the overall width (W) of approximately 85.60 mm and height (H) of approximately 53.98 mm, as shown in FIG. 3A. Computer interface device 210 may have one or more contact points 301 for interfacing with computing device 120. Contact points 301 may communicatively connect to corresponding pins or plates of a port in computing device 120 to facilitate the transfer of data between computing device 120 and transaction card 110. Transaction card 110 may also include smart card contact 220, which may allow smart card transactions, such as an EMV payment, as described above. For example, smart card contact 220 may be configured such that transaction card 110 may be inserted into a smart card reader to perform the smart card transaction. Accordingly, the physical properties of smart card contact 220 may comply with one or more international standards such as ISO/IEC 7816, ISO/IEC 14443 or the like. In some embodiments, smart card contact 220 may be disposed in proximity to an edge of transaction card 110 opposite to or distanced from an edge on which computing interface device 210 is disposed. In some embodiments, for example, a first distance between smart card contact 220 and a first edge (e.g., the edge of transaction card 110 subtended by height H in FIG. 3A) may be less than a distance between smart card contact 220 and computing interface device 210. Additionally or alternatively, a second distance between smart card contact 220 and a second edge (e.g., the edge subtended by width W in FIG. 3A) may be less than the distance between smart card contact 220 and computing interface device 210.

FIG. 3B shows a reverse side of transaction card 110 from the side shown in FIG. 3A. Transaction card 110 may have one or more additional components to facilitate or improve the use of transaction card 110. For example, transaction card 110 may have a magnetic strip 310, a hologram 311, a signature block 312, an imprinted name and/or account number, an expiration date, a card verification value (CVV) code, or various other card features.

Figure 4:
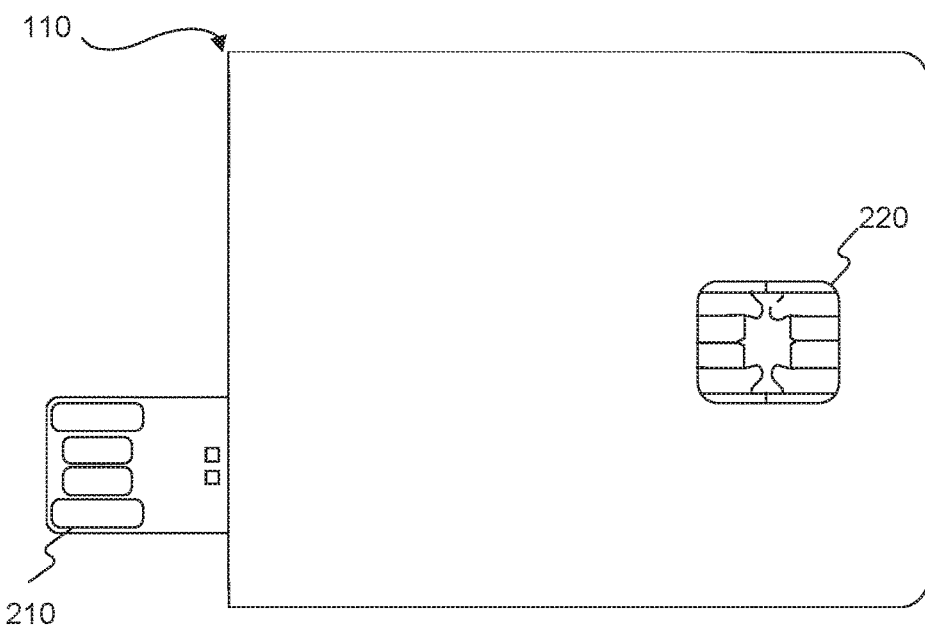
FIG. 4 illustrates an alternate configuration of a transaction card with an integrated interface device in accordance with disclosed embodiments.

Transaction card 110 may also have various other configurations or components for integrating card interface device 210. FIG. 4 illustrates an alternate configuration of a transaction card 110 with an integrated interface device 210 (e.g., a USB device) in accordance with disclosed embodiments. In this embodiment, a side of transaction card 110 may be cut out, shortened, or removed to include computer interface device 210. Various other shapes or arrangements may also be used. For example, transaction card 110 may have a cutout on the bottom of the card for including computer interface device 210. The cutout may also have other shapes, such as a curved or geometric shape, to integrate computer interface device 210 and provide sufficient clearance such that computer interface device may be inserted into computing device 120. Transaction card 110 may also include smart card contact 220 disposed and placed in a manner as described above (e.g., distanced from an edge of transaction card 110 on which computing interface device 210 is disposed).

Figure 5:
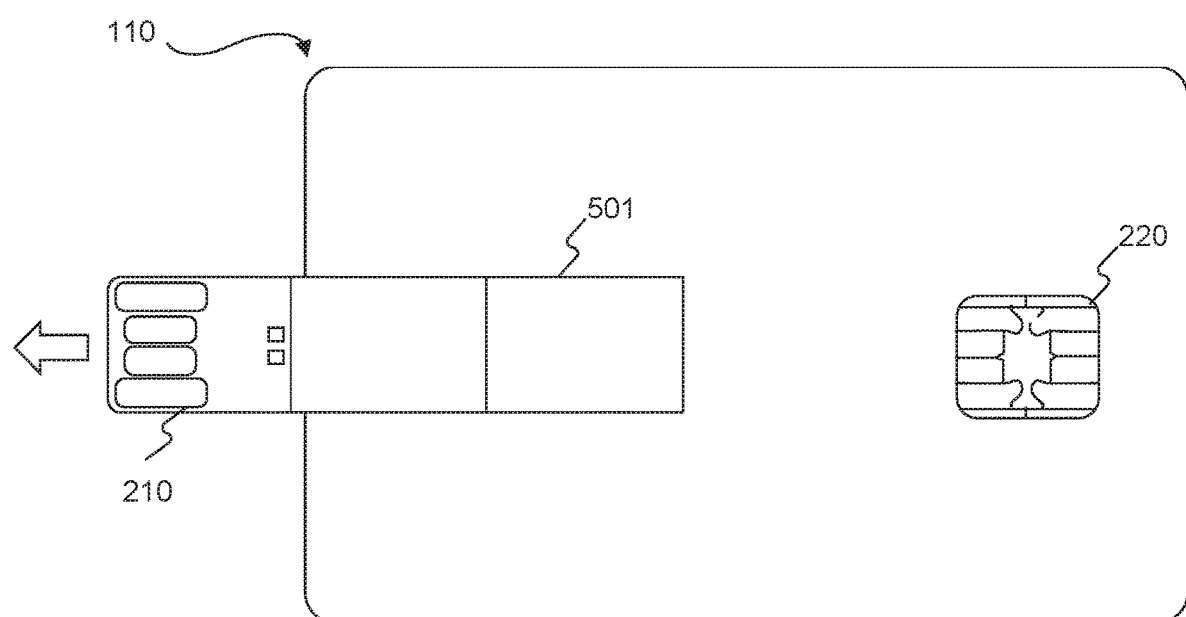
FIG. 5 illustrates an exemplary transaction card with a slidable integrated interface device in accordance with disclosed embodiments.

FIG. 5 illustrates an exemplary transaction card 110 with a slidable integrated interface device 210 (e.g., a USB device) in accordance with disclosed embodiments. Accordingly, transaction card 110 may have a track component 501 which may allow computer interface device 210 to slide from a retracted position, where computer interface device 210 is substantially or completely contained within the outer perimeter of transaction card 110, to an extended position (e.g., as shown in FIG. 5) for inserting into computing device 120. Track component 510 may comprise a cutout portion of transaction card 110 to receive computer interface device 210. Track component 510 may have additional features to guide computer interface device 210. For example, the inner surface of the cutout may comprise grooves for receiving a corresponding element of the sliding portion of transaction card 110. In some embodiments, transaction card 110 may have additional features to facilitate sliding card interface device 210 between its retracted and extended position. For example, the sliding portion of transaction card 110 may comprise a rubberized or otherwise grippable surface to facilitate sliding the computer interface device. Similarly, transaction card may include one or more ridges, bumps, grooves or other features to increase grip. Various other locations, sizes, and configurations of a slidable computer interface device 210 may be used. Transaction card 110 may also include smart card contact 220 disposed and placed in a manner as described above (e.g., distanced from an edge of transaction card 110 on which computing interface device 210 is disposed).

In some embodiments, some or all of the components of transaction card 110 described with respect to FIG. 2 may be included on a sliding portion of transaction card 110. For example, smart card contact 220 as well as various internal components (e.g., processor 230, card reader module 260, memory 240, etc.) may be included on the sliding portion. In such embodiments, track component 510 would not need to accommodate communication between the sliding portion and nonsliding portion of transaction card 110. In other embodiments, transaction card 110 may include wires for communicatively coupling computer interface device 210 with other components on transaction card 110. In some embodiments, track component 510 may have one or more corresponding contact points, pins, plates, grooves, etc. for providing a communication interface between the sliding and non-sliding portions of transaction card 110.

Figure 6:
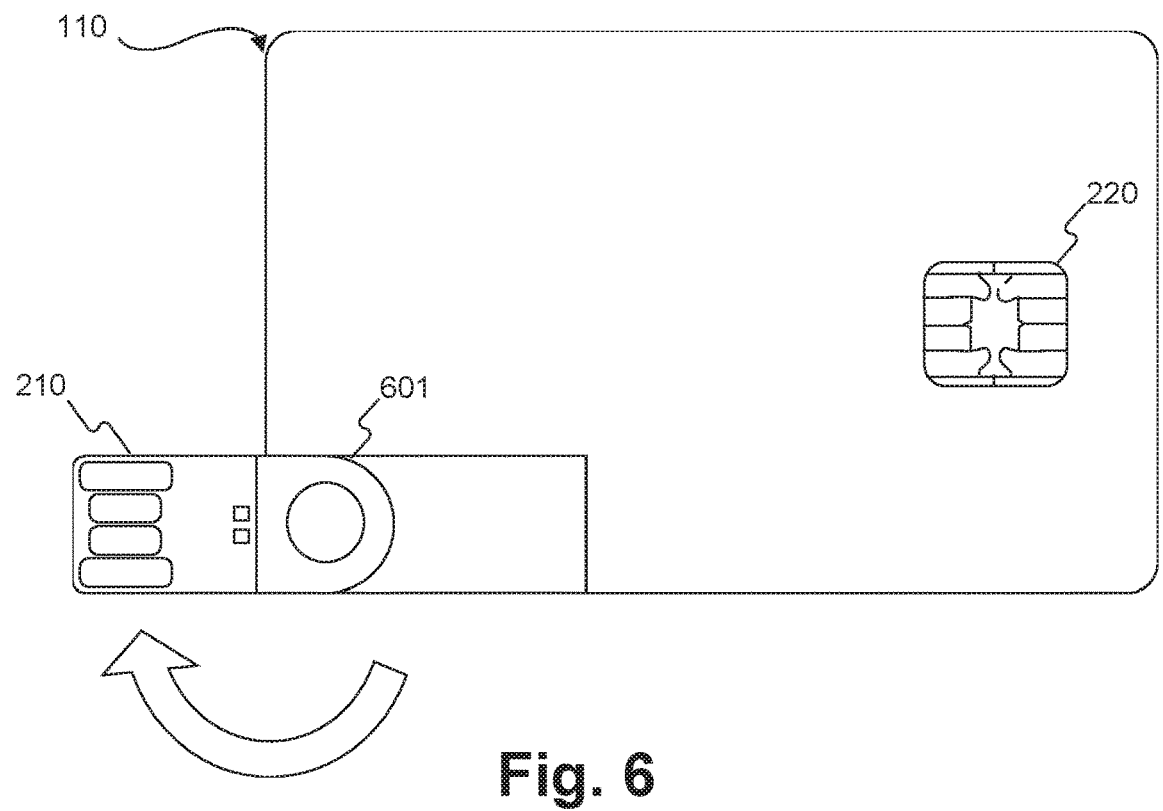
FIG. 6 illustrates an exemplary transaction card with a rotatable integrated interface device in accordance with disclosed embodiments.

FIG. 6 illustrates an exemplary transaction card 110 with a rotatable integrated interface device 210 (e.g., a USB device) in accordance with disclosed embodiments. As shown in FIG. 6, computer interface device 210 may be rotatably connected to a portion of transaction card 110 (e.g., via rotating component 601 discussed below) such that interface device 210 may rotate from an initial position to an extended position, allowing insertion of computer interface device 210 into computing device 120. In some embodiments, the initial position may be wholly or substantially contained without the outer perimeter of transaction card 110, and the extended position may be orthogonal to a first edge, second edge, or first surface of transaction card 110.

For example, computer interface device 210 may be rotated to provide sufficient clearance such that other portions of transaction card 110 do not prevent insertion into computing device 120. In some embodiments, computer interface device 210 may be disposed on the nonrotating portion of transaction card 110 and the rotating portion may, for example, act as a guard or shield for computer interface device 210.

Accordingly, transaction card 110 may have one or more rotating components 601 facilitating the rotatable connection of interface device 210 to transaction card 110. In some embodiments, rotating components may comprise a revolute joint, pins, hinges, ball-and-socket joints, bearings, etc. for rotatably coupling or connecting interface device 210 to transaction card 110. Similar to track component 501 described above, rotating component 601 may have various communication components, such as wires or corresponding contact points, pins, plates, grooves, etc., for providing a communication interface between the rotating and nonrotating portions of transaction card 110 (e.g., with interface device 210). In other embodiments, other components of transaction card 110 (e.g., processor 230, card reader module 260, memory 240, smart card contact 220, etc.) may be disposed on the same portion of transaction card 110 as computer interface device 210 such that no communication through rotating component 601 is necessary.

Figure 7:
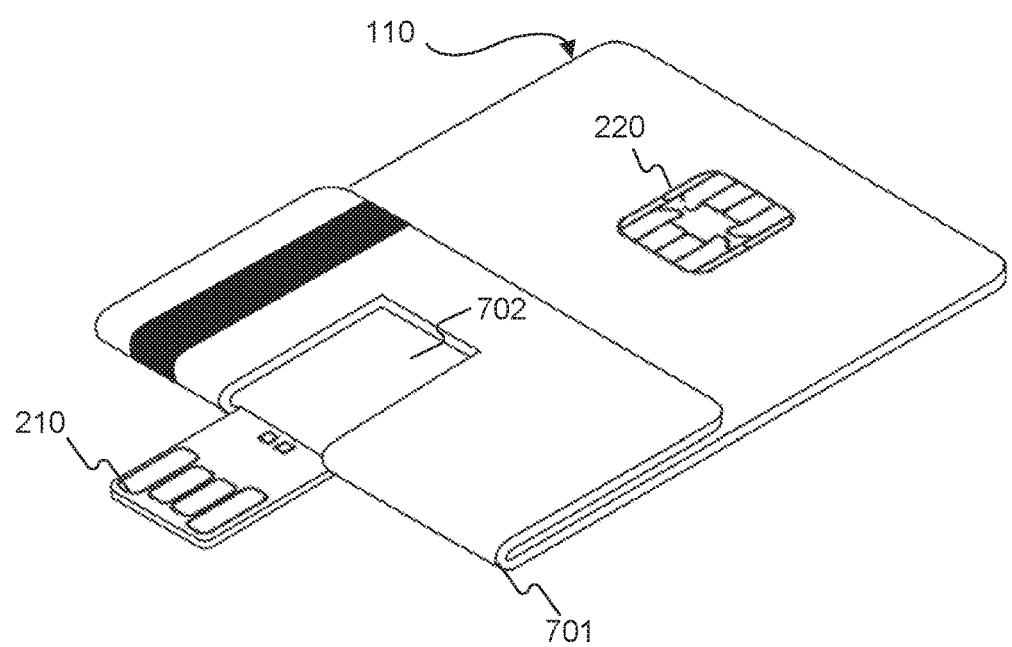
FIG. 7 illustrates an exemplary foldable transaction card with an integrated interface device in accordance with disclosed embodiments.

Transaction card 110 may also have one or more foldable portions to facilitate the insertion of computer interface device 210 into computing device 120. FIG. 7 illustrates an exemplary foldable transaction card 110 with an integrated interface device 210 (e.g., USB device) in accordance with disclosed embodiments. Transaction card may be configured such that, when laid flat in an unfolded position, computer interface device 210 is contained within the perimeter of transaction card 110. As shown in FIG. 7, transaction card 110 may be foldable such that computer interface device 210 protrudes outward and is thereby insertable into computing device 120 when foldable component 710 is in a folded position. Accordingly, transaction card 110 may have one or more foldable component(s) 701 to facilitate the folding of transaction card 110. In some embodiments, foldable component 701 may comprise a flexible portion, which may be constructed of a flexible plastic (e.g., a thermoplastic elastomer), rubber, or the like. Foldable component 701 may also be a hinged component, and may, for example, comprise a pin to provide rotating interface between the two portions of transaction card 110. In some embodiments, foldable component 701 may be a living hinge and the two portions of transaction card 110 may be integrally connected. Transaction card 110 may also comprise one or more cutouts 702 for receiving computer interface device 210 when transaction card 110 is in the unfolded position. Transaction card 110 may be configured that smart card contact 220 may be used for completing transactions through a card reader device. For example, smart card contact 220 may be disposed on a substantially rigid portion of the transaction card 110 such that it can be inserted into a card reader, as shown. Additionally or alternatively, smart card contact 220 may be disposed and placed in a manner as described above (e.g., in closer proximity to one or more edges of transaction card 110 than an edge formed when foldable component 701 is in a folded position).

Figure 8:
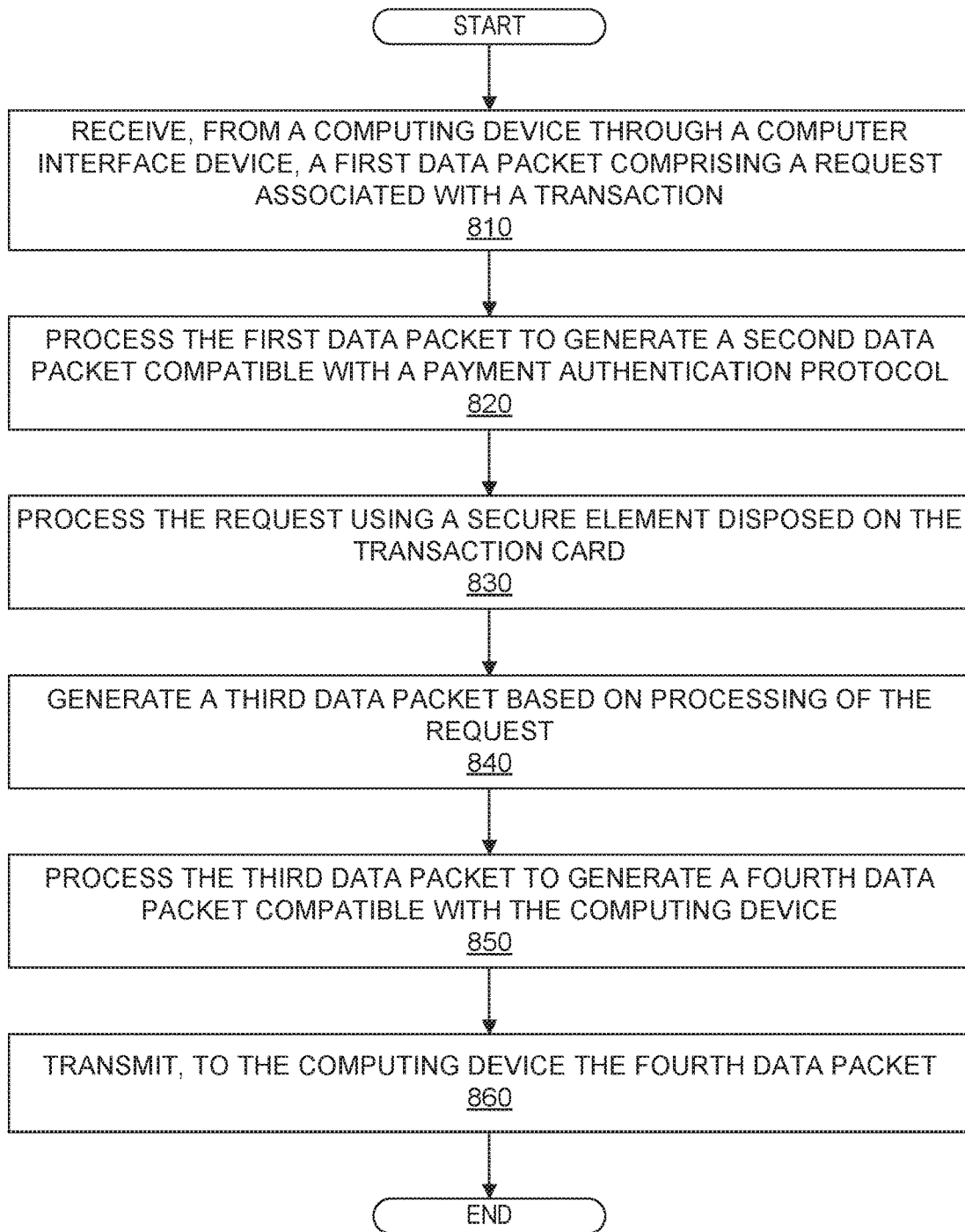
FIG. 8 is a flowchart illustrating an exemplary process for completing a transaction using a transaction card with an integrated interface device in accordance with disclosed embodiments.

FIG. 8 is a flowchart illustrating an exemplary process 800 for completing a transaction using a transaction card (e.g., transaction card 110) with an integrated interface device (e.g., interface device 210 such as a USB device) in accordance with disclosed embodiments. Process 800 may be performed by the transaction card inserted into a computing device (e.g., computing device 120) or computing device 120 itself. Thus, while certain aspects of the following embodiments are generally described from the perspective of transaction card 110, it should be appreciated that reciprocal or the same processes may take place on corresponding components of computing device 120, or any other computing device connected to network 130 (e.g., a remote server associated with a financial institution).

In certain aspects, the transaction card 110 may comprise the computer interface device configured to connect to a port of the computing device (e.g., a USB port, HDMI port, SD port, or other such port). The transaction card may further comprise at least one memory device (e.g., memory 240) storing instructions and at least one processor (e.g., processor 230) for executing the instructions to conduct a verification process for a transaction using a payment authentication protocol. The transaction card may further comprise a card reader module (e.g., card reader module 260) communicatively coupled to the computer interface device and the at least one processor. Process 800 may be performed, for example, by transaction card 110, described above. Computer interface device 210 of transaction card 110 may be inserted into a port of computing device 120 to perform a transaction over network 130, such as an online payment, online transaction, online balance transfer, or the like. In some embodiments, process 800 may allow an online merchant or service to accept payments through a USB or similar port without the need for a card reader. Process 800 may further allow the online merchant or service to accept the payment as a card-present payment, for example through an EMV cryptographic exchange.

At step 810, process 800 may include receiving, from a computing device through a computer interface device, a first data packet comprising (or partially comprising) a request associated with a transaction (e.g., an online transaction initiated with the computing device). The computer interface device may comprise a connector compatible with a standard computing device, such as a USB connector. For example, transaction card 110 may receive the first data packet from computing device 120 through computer interface device 210. The transaction may be a transaction performed on or through computing device 120, such as an online payment conducted over network 130. The transaction may be associated with a payment authentication protocol such as an EMV payment standard or the like. In some embodiments, the computing device may be a handheld or mobile device, such as a mobile phone. In some embodiments, card reader module 260 and/or processor 230 may also be configured to detect that the computer interface device has been connected to the port of the computing device. In certain aspects, transaction card 110 may be configured to passively or actively monitor signals from one or more of its components (e.g., computer interface device 210) to determine whether and when computer interface device 210 becomes inserted into a port of computing device 120.

The request associated with the first data packet may be transmitted to the transaction card 110 in order to carry out the transaction. The request may comprise a request for information associated with the transaction card 110 or cardholder, such as an account number, the cardholder's name, the cardholder's address, etc. In some embodiments, computing device 120 may be configured to automatically provide this information to the online retailer based on data received from transaction card 110 via computer interface device 210. For example, computing device 120 may automatically populate a form or webpage using payment or identification information received from transaction card 110 via computer interface device 210 using data conversion techniques consistent with the disclosed embodiments. In some embodiments, the request may also comprise a card data authentication request, for example using Static Data Authentication (SDA), Dynamic Data Authentication (DDA), Combined Data Authentication (CDA), or the like. In other embodiments, the request may be part of a cardholder verification request, or other function performed using the transaction card. The request may be received by transaction card 110 through the one or more first data packets. The first data packet or packets may be compatible with an interface protocol, such as a USB protocol, as described above.

In step 820, process 800 may include processing, by a card reader module (e.g., card reader module 260) disposed on the transaction card 110, the first data packet to generate a second data packet compatible with the payment authentication protocol. In some embodiments, a format or protocol associated with the first data packet may be distinct from the format or protocol (e.g., the payment authentication protocol) associated with the second data packet. For example, the first data packet may be compatible with a USB protocol, and card reader module 260 may be configured to convert or translate the first data packet into a second data packet with an updated format or protocol. In some embodiments, for example, the second data packet may be a command ADPU as described above. Accordingly, the second data packet may be compatible with the payment authentication protocol.

In certain aspects, for example, transaction card 110 may be configured to identify a first protocol or format (e.g., a USB protocol) associated with the first data packet based on a signal received from computer interface device 210, based on information contained in the first data packet (e.g., recognizing an identifying header, metadata, transaction type, etc.), based on an analysis of the received data packet or signal at card reader module 260, or based on any other similar consideration consistent with the disclosed embodiments. Similarly, transaction card 110 may identify the second format or protocol for the second data packet based on a signal received from computer interface device 210, based on information contained in the first data packet (e.g., indicating that the requested transaction reflects a purchase transaction, a balance transfer, etc.), based on one or more determined or known protocols or formats compatible with computer interface device 210, card reader module 260, smart card contact 220, or any other such consideration consistent with the disclosed embodiments. In some aspects, transaction card 110 may store the routines and algorithms for converting or translating data from the first protocol or format into the second protocol or format for use by card reader module 260. Additionally or alternatively, the conversion routines may be transmitted as part of a signal or the first data packet associated with computer interface device 210, or may be obtained from another computing device (e.g., computing device 120 or another device connected to network 130) via communication component 270, computer interface device 210, etc.

In step 830, process 800 may include processing the request using a secure element (e.g., secure element 250) disposed on the transaction card 110. For example, card reader module 260 may provide the second data packet to processor 230, which may perform step 830. As described above, the request may be associated with a request for information, a card data authentication request, a cardholder verification request, another process for completing the transaction, or any other request consistent with the disclosed embodiments. In some embodiments, transaction card 110 may further comprise a secure element 250 communicatively coupled with the processor 230. The verification process may comprise verifying, using the secure element, that the transaction card is in physical presence of a cardholder associated with the transaction. For example, the secure element may comprise a cryptographic key which may be used to sign data provided by processor 130 for authenticating transaction card 110.

In step 840, process 800 may include generating a third data packet based on the processing of the request. For example, the third data packet may comprise or partially comprise a response to the request received from computing device 120 pertaining to a transaction. In some embodiments, the third data packet may be associated with a format or protocol identical to one associated with the second data packet, such as the payment authentication protocol. For example, the third data packet may comprise a response ADPU generated by processor 130 based on the processing in step 830.

In step 850, process 800 may include processing, by the card reader module 260, the third data packet to generate a fourth data packet compatible with an interface protocol. For example, card reader module 260 may receive the third data packet from processor 130. Card reader module 260 may process the third data packet to convert it to a fourth data packet compatible with the interface protocol associated with computer interface device 210, such as the USB protocol described above. In some embodiments transaction card 110 may be configured to convert or translate data from a second format or protocol (e.g., a payment authentication protocol) into a first format or protocol (e.g., a USB protocol) in a manner similar to that described above for the reciprocal conversation and translation routines. For example, transaction card may be configured to identify the first and second formats and protocols based on information contained in the first, second, third, or fourth data packets, based on a signal received from computer interface device 210, card reader module 260, or any other component of transaction card 110. Transaction card 110 may also store the routines and algorithms for converting or translating data from the second protocol or format into the first protocol or format, or additionally or alternatively may be configured to obtain such routines from another computing device via network 130. In step 860, process 800 may include transmitting, to the computing device 120 through the computer interface device 210, the fourth data packet, which may enable the computing device 120 to complete the transaction. In some aspects, for instance, transmitting the fourth data packet (e.g., formatted in a USB protocol) to computing device 120 via computer interface device 210 may facilitate and complete a requested online transaction initiated at computing device 120.

In some embodiments, process 800 may be performed in the absence of a transaction. For example, transaction card 110 may be used to authenticate a user of computing device 120 through a multifactor authentication process. As an illustrative example, a cardholder may be attempting to login to an account, such as a financial services account, a banking account, a network account, or any other account requiring credentials of the user. In some embodiments, transaction card 110 may be used to provide a second form of authentication for the cardholder associated with the account. For example, a user's physical possession of transaction card 110 associated with the user's purported identity may indicate that the user is who they purport to be. Accordingly, the user may insert transaction card 110 into computing device 120 for authenticating the identity of a user. In these embodiments, the steps of process 800 may be similar to or the same as those above, but the various steps may not be associated with a transaction but rather a login or other authentication process. Further, rather than a payment authentication protocol, another form of authentication protocol may be used, such as a FIDO CTAP standard (e.g., FIDO U2F, FIDO UAF, FIDO 2, etc.) or the like.

In some embodiments, transaction card 110 may be configured to perform further authentication for the user of computing device 120 and/or transaction card 110. In these embodiments, process 800 may comprise one or more additional steps. Alternatively, these steps may be undertaken distinct and separate from process 800.

Figure 9:
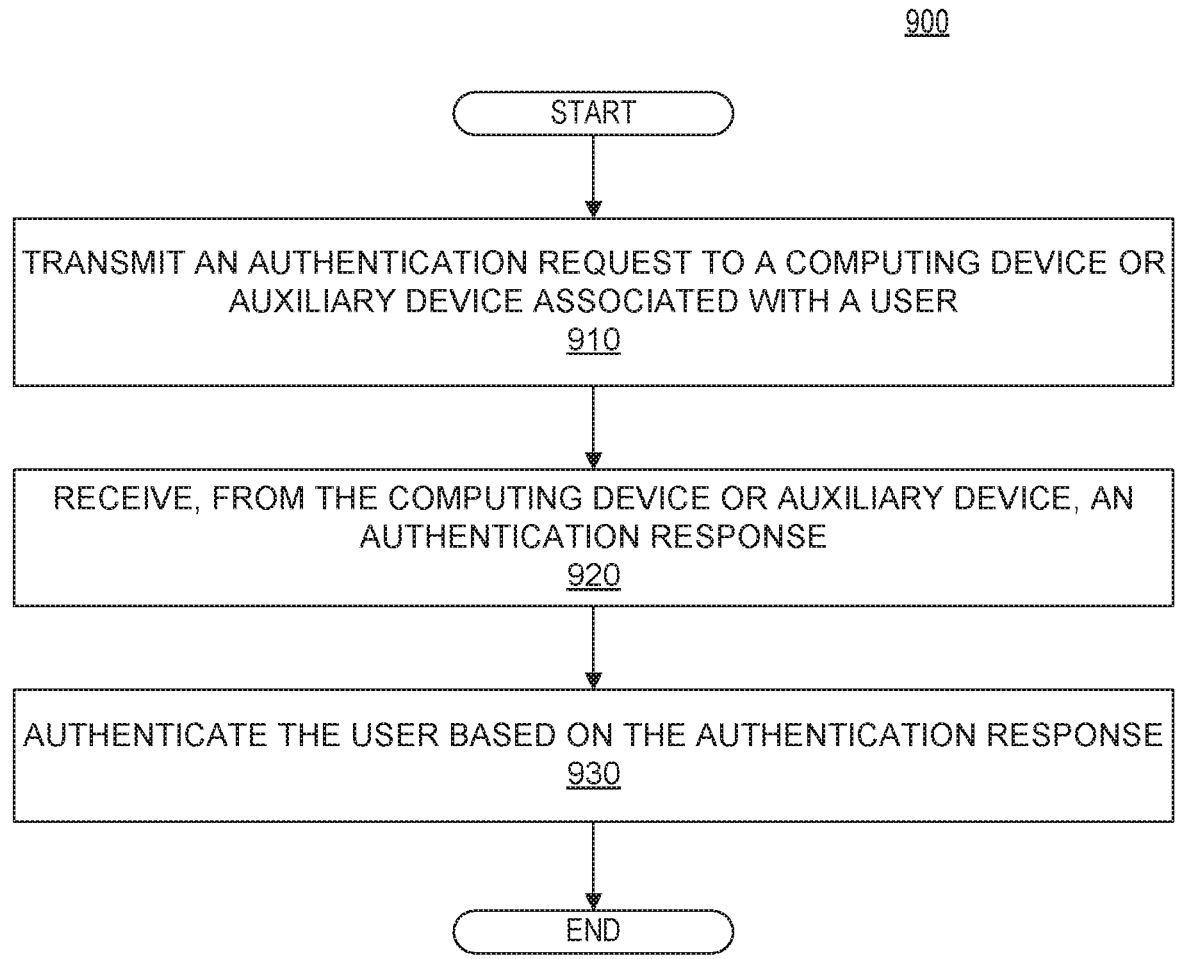
FIG. 9 is a flowchart illustrating an exemplary process of authenticating a user consistent with the disclosed embodiments.

FIG. 9 is a flowchart illustrating an exemplary process 900 of authenticating a user via transaction card 110. Process 900 may be performed by transaction card 110 or computing device 120, either in conjunction with or separate from process 800. By way of example, transaction card 110 may be configured to conduct an authentication process consistent with process 900 based on and in combination with any of the steps and embodiments consistent with process 800. By way of nonlimiting example, transaction card 110 may be configured to conduct authentication process 900 upon determining that computer interface device 210 has been inserted into a port of computing device 120 (e.g., based on a signal received from computer interface device, card reader module 260, etc.), upon generating a data packet (e.g., the second, third, or fourth data packets), immediately prior to completing the transaction, prior to transmitting the fourth data packet, etc.

In step 910, for example, process 900 may include transmitting an instruction for generating an authentication request to at least one of (i) the computing device 120, (ii) an auxiliary device 140 associated with a user, and/or (iii) a computing device connected to network 130 (e.g., a remote server associated with a third party, with a merchant associated with the transaction, with a server associated with an authentication entity, etc.). For example, transaction card 110 may transmit an instruction to provide and authentication request to auxiliary device 140, which may be a mobile phone or other device associated with a cardholder of transaction card 110. In certain aspects, the authentication request may reflect a request for one or more credentials identifying a user and may be based on one or more transaction parameters, as discussed below.

In some embodiments, the authentication request instruction may be transmitted from the transaction card directly, for example, using communication component 270. In other embodiments, the authentication request instruction may be sent through computing device 120, such as via a signal transmitted to computer interface device 210 in the appropriate format (e.g., a USB format). For example, transaction card 110 may provide instructions to computing device 120 to transmit the authentication request via network 130. In some aspects, the instruction for generating the authentication request may comprise the authentication request itself. Additionally or alternatively, the instruction for generating the authentication request may cause a component of environment 100 (e.g., auxiliary device 140 and/or computing device 120) to generate the authentication request.

In step 920, process 900 may include receiving (e.g., from the computing device or auxiliary device) an authentication response responding to the authentication request. For example, auxiliary device 140 and/or computing device 120 may display a prompt to the user. In some embodiments, the prompt may comprise a request for user to enter, input, or otherwise provide one or more credentials identifying the user (e.g., a fingerprint, retinal or facial scan, password, pin, login, username, randomly generated n-digit code, biometric measure, MAC or IP address, etc.) via an appropriate input means consistent with the disclosed embodiments (e.g., a physical or displayed keyboard, a camera, a biometric scanner, or any other suitable peripheral). In other embodiments, auxiliary device 140 may prompt the user to approve or deny the transaction. Auxiliary device 140 and/or computing device 120 may be configured to display the generated prompt from the user (e.g., via a display or touchscreen display associated with computing device 120 and/or auxiliary device 140) and may be configured to receive the authentication response via input means discussed herein (e.g., a keyboard, camera, etc.).

In certain aspects, the type and/or number of credentials requested in process 900 (e.g., as requested in the authentication request in step 910 and/or provided in the authentication response in step 920) may be based on one or more transaction parameters associated with the transaction. For example, process 900 may generate an authentication request seeking first set of credentials (e.g., an approval or denial) based on a first set of transaction parameters for a first transaction, and may seek a second set of credentials (e.g., a biographic measure, username and password, etc.) based on a second set of transaction parameters for a second transaction. In some embodiments, the transaction parameters may comprise, but are not limited to, a transaction type, a transaction amount, a merchant identity associated with the transaction, a merchant type associated with the transaction, a transaction frequency (e.g., associated with a user, an account associated with the user, a frequency of transactions associated with transaction card 110, computing device 120, and/or auxiliary device 140, etc.) over one or more time periods, a location associated with the transaction (e.g., a location associated with the merchant, computing device 120, auxiliary device 140, transaction card 110, etc.), a type of computer interface device 210 (e.g., USB), a security level associated with network 130 (e.g., based on an identified encryption standard for a website associated with an online transaction), any combination of the foregoing parameters (e.g., a transaction frequency for a particular merchant or merchant type using transaction card 110), and so on. The transaction parameters may be determined and/or identified by transaction card 110, computing device 120, auxiliary device 140, and/or another computing device connected to network 130 to conduct processes consistent with the disclosed embodiments.

Upon receiving a response from the user, auxiliary device 140 and/or computing device 120 may transmit an authentication response to transaction card 110, which may be received, for example, through communication component 270 or computing device 120 via computer interface device 210. In step 930, process 900 may include authenticating the user based on the authentication response received in step 920. For example, if the authentication request includes a request for credentials, step 930 may include verifying the received credentials (e.g., by matching the received credentials from those stored in one or more memories in environment 100, such as in auxiliary device 140, computing device 120, or in a server connected to network 130). Accordingly, step 930 may further include accessing a resource (e.g., a server, database, etc.) for verifying the received credentials. In other embodiments, the authentication response may be an approval of a transaction. Computing system 120 or other components associated with environment 100 may take additional steps based on authenticating the user, such as completing a transaction, logging in to a banking application, etc. By way of example, the components of 100 may complete the transaction, balance transfers, etc. upon successful authentication of the user. In some embodiments, authentication in step 930 may allow various other steps to be performed, including any steps performed by transaction card 110 or computing device 120 as part of process 800. In some embodiments, for instance, authenticating a user may cause transaction card 110 to transmit a data packet to computing device 120 via computing interface device 210 to facilitate completing a transaction. In other aspects, authenticating a user may cause one or more of the various data packets or translation routines discussed for process 800 to be conducted. Accordingly, using process 900, additional verification may be performed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including by reordering steps, combining steps, or inserting or deleting steps.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A transaction card for authenticating a user of a computing device, comprising:
a processor;
a computer interface device; and
a card reader module communicatively coupled to the processor and the computer interface device, and configured to:
determine that the computer interface device has been inserted to a port of the computing device,
transmit, through the computer interface device to the computing device, an instruction for generating an authentication request, the authentication request indicative of a request for one or more credentials identifying the user,
receive, through the computer interface device from the computing device, an authentication response responding to the authentication request, the authentication response including the one or more credentials identifying the user, and
authenticate the user based on the authentication response.

2. The transaction card of claim 1, wherein the card reader module is configured to complete a transaction that is associated with a payment authentication protocol.

3. The transaction card of claim 2, wherein determining that the computer interface device has been inserted into a port of a computing device is based on a signal received from the computer interface device upon generating a data packet, (e.g., the second, third, or fourth data packets), immediately prior to completing the transaction.

4. The transaction card of claim 2, wherein determining that the computer interface device has been inserted into a port of a computing device is based on a signal received from the computer interface device immediately prior to completing the transaction.

5. The transaction card of claim 1, further comprising a secure element, and the secure element is configured to perform a verification process.

6. The transaction card of claim 4, wherein the verification process comprises verifying, using the secure element, that the transaction card is in physical presence of a cardholder associated with the transaction.

7. The transaction card of claim 1, wherein the card reader module is further configured to transmit, through the computer interface device to an auxiliary device associated with the user, an instruction for generating an authentication request.

8. The transaction card of claim 1, wherein the card reader module is further configured to transmit, through the computer interface device to a computing device connected to a network, an instruction for generating an authentication request.

9. The transaction card of claim 8, wherein the computing device connected to a network includes one of a remote server associated with a third party, a remote server associated with a merchant, and a server associated with an authentication entity.

10. The transaction card of claim 1, wherein the computing device is configured to display a prompt to the user, the prompt comprising a request for the user to enter, input, or otherwise provide one or more credentials identifying the user.

11. The transaction card of claim 10, wherein the one or more credentials include a fingerprint, retinal or facial scan, password, pin, login, username, randomly generated digit code, biometric measure, MAC or IP address.

12. A method for authenticating a user of a computing device performed by a transaction card, the transaction card comprising a processor; a computer interface device; and a card reader module communicatively coupled to the processor and the computer interface device, the method comprising:

determining that the computer interface device has been inserted to a port of the computing device;

transmitting, through the computer interface device to the computing device, an instruction for generating an authentication request, the authentication request indicative of a request for one or more credentials identifying the user;

receiving, through the computer interface device from the computing device, an authentication response responding to the authentication request, the authentication response including the one or more credentials identifying the user; and authenticating the user based on the authentication response.

13. The method of claim 12, further comprising transmitting, through the computer interface device to an auxiliary device, an instruction for generating an authentication request, wherein the auxiliary device includes a mobile phone or other device associated with a cardholder of the transaction card.

14. The method of claim 12, wherein the authentication request reflects a request for one or more credentials identifying a user and is based on one or more transaction parameters.

15. The method of claim 14, wherein the one or more transaction parameters comprise one or more of a transaction type, a transaction amount, a merchant identity associated with the transaction, a merchant type associated with the transaction, a transaction frequency over one or more time periods, a location associated with the transaction, a type of computer interface device, or a security level associated with the network.

16. The method of claim 12, wherein the authentication request instruction is sent via a signal transmitted to the computer interface device in a USB format.

17. A non-transitory computer-readable medium having instruction stored thereon that, when executed by a transaction card comprising a processor, a computer interface device, and a card reader module communicatively coupled to the processor and the computer interface device, cause the transaction card to perform the procedures comprising:

determining that the computer interface device has been inserted to a port of the computing device;

transmitting, through the computer interface device to the computing device, an instruction for generating an authentication request, the authentication request indicative of a request for one or more credentials identifying the user;

receiving, through the computer interface device from the computing device, an authentication response responding to the authentication request, the authentication response including the one or more credentials identifying the user; and authenticating the user based on the authentication response.

18. The non-transitory computer-readable medium of claim 17, wherein the authentication response is an approval of a transaction.

19. The non-transitory computer-readable medium of claim 17, the procedures further comprises transmitting a data packet to the computing device via the computing interface device to facilitate completing a transaction.

20. The non-transitory computer-readable medium of claim 17, wherein the authentication request is based on one or more transaction parameters.

21. The non-transitory computer-readable medium of claim 20, wherein the one or more transaction parameters comprise one or more of a transaction type, a transaction amount, a merchant identity associated with the transaction, a merchant type associated with the transaction, a transaction frequency over one or more time periods, a location associated with the transaction, a type of computer interface device, or a security level associated with the network.

\* \* \* \* \*